(No Model.)
J. C. HADDAN & H. SMITH.
Carving Fork.
No. 237,521.  Patented Feb. 8, 1881.
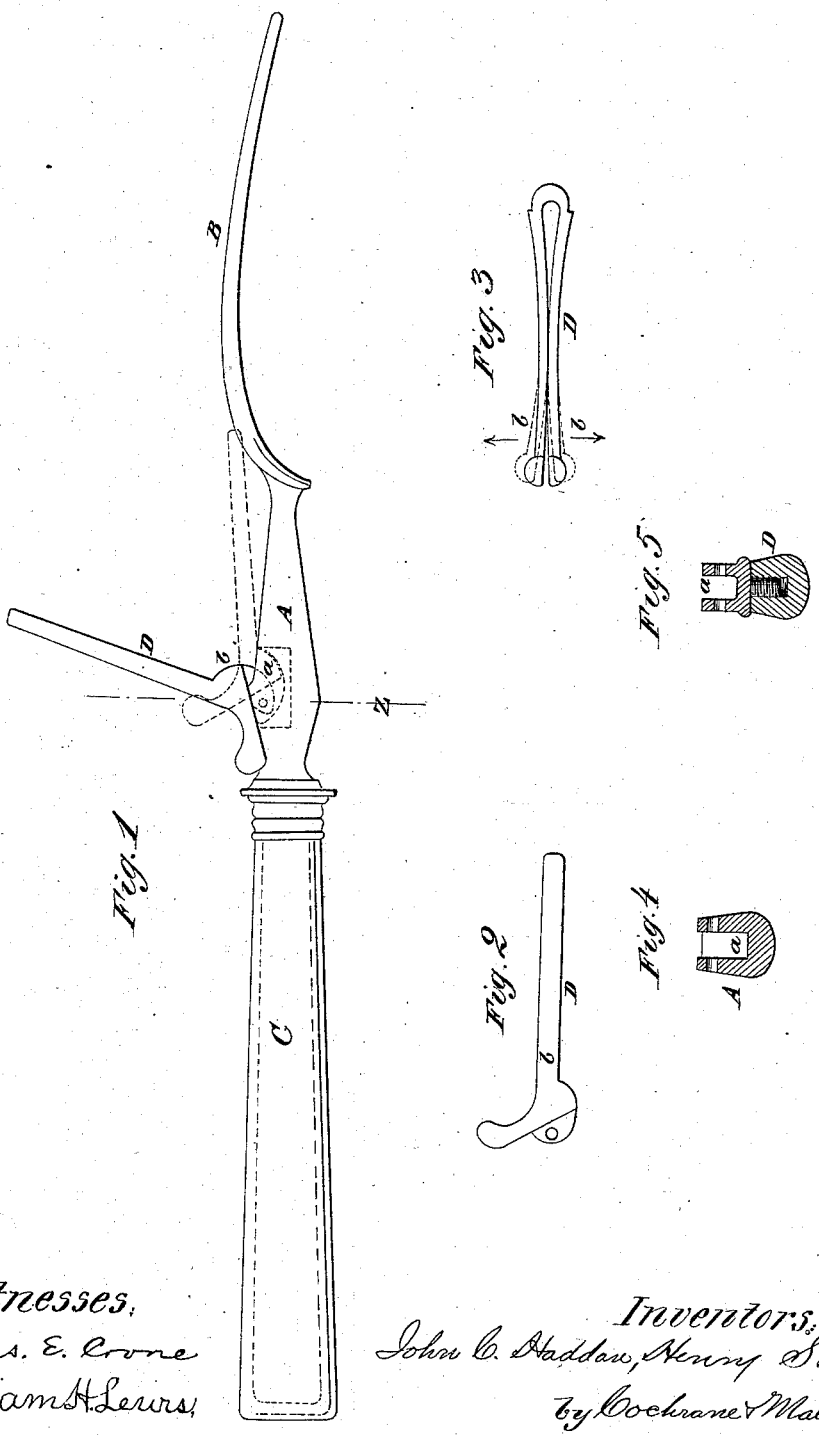
Witnesses,
Chas. E. Crone
William H. Lewis
Inventors,
John C. Haddan, Henry Smith
by Cochrane & Malcomson
their Attorneys

UNITED STATES PATENT OFFICE.

JOHN C. HADDAN, OF BRIXTON, LONDON, COUNTY OF SURREY, AND HENRY SMITH, OF COVENT GARDEN, LONDON, COUNTY OF MIDDLESEX, ENGLAND.

CARVING-FORK.

SPECIFICATION forming part of Letters Patent No. 237,521, dated February 8, 1881.

Application filed May 14, 1880. (No model.) Patented in England February 4, 1875.

*To all whom it may concern:*

Be it known that we, JOHN COOPE HADDAN, residing at Brixton, London, in the county of Surrey, and HENRY SMITH, residing at Covent Garden, London, in the county of Middlesex, England, have invented certain new and useful Improvements in Carving-Forks, for which we have received Letters Patent in England, No. 412, dated February 4, 1875; and we do hereby declare that the following is a full, clear, and exact description of the same.

The invention relates to the construction of carving-forks with the hinged guard split or divided throughout its length or at the lower or hinged end, which is inserted in a recess in the shank, and so regulated or set as to spring outward, and by friction against the sides of the recess maintain the guard in any desired position.

In the drawings, Figure 1 is a side view, the guard being shown by full lines in the raised position and by dotted lines in the down position. Figs. 2 and 3 are detached side and plan views of the guard only. Fig. 4 shows a cross-section at *z* in Fig. 1. Fig. 5 is a cross-section, showing how the guard may be used in combination with a detached piece.

The object of this invention is to provide a construction and arrangement of guard which will not require any auxiliary spring or be liable to get out of order until the fork is worn out.

The general construction of our improved fork and guard is shown by Fig. 1, the guard being shown separate at Figs. 2 and 3. This guard is composed of the two members *b b*, united in one at the top, and leaving the lower ends regulated or set to spring away from each other.

A is the shank or body of the fork, with the usual arrangement of prongs B and a tang projecting into the handle C.

There is a recess, *a*, formed in the body or shank of the fork, as shown by the dotted lines in Fig. 1 and the cross-section, Fig. 4, and into this recess the members *b b* of the guard D, at the open end, are introduced by pressing them together, so that when in position they will spring outward and press against the sides of the recess *a*, and they are secured to the shank by a rivet passing through holes in it and corresponding holes in the ends of the guard.

In some cases the shank may be furnished with an applied hinge-piece, instead of making the recess in the shank. This applied hinge-piece is shown in Fig. 5, and is intended to be screwed into the shank.

In securing the guard in position the use of rivets may be dispensed with, if desired, and pinions or projections formed on the ends of the guard, so as to spring into corresponding holes in the recess. In all cases the set or spring at the open end of the guard is sufficient to create enough friction to sustain it in any desired position.

It is not designed to have the guard in any way extend past the shank of the fork, so as to form a rest, and we do not desire to claim such a device. The guard terminates at the shank and folds or lies down, so as to be even with the raised portion of the handle and prongs without any projection underneath. This is shown in Fig. 1 by the dotted lines.

What we claim as our invention, and desire to secure by Letters Patent of the United States, is—

A carving-fork in which the guard D consists of two spring members, *b b*, united at their outer ends, and with their inner ends journaled in and adapted to bear against the sides of the socket or recess *a*, so as to hold the guard in any desired position, substantially as shown and described.

J. C. HADDAN.
HENRY SMITH.

Witnesses:
CHAS. ROCHE,
G. W. VOLLETT,
*Both of 2 Waterloo Place, Pall Mall, London, Notary's Clerks.*